C. CASTRO.
FLUID MIXER AND POWER GENERATOR FOR ROTARY ENGINES.
APPLICATION FILED OCT. 20, 1914.
1,185,982.
Patented June 6, 1916.
2 SHEETS—SHEET 1.
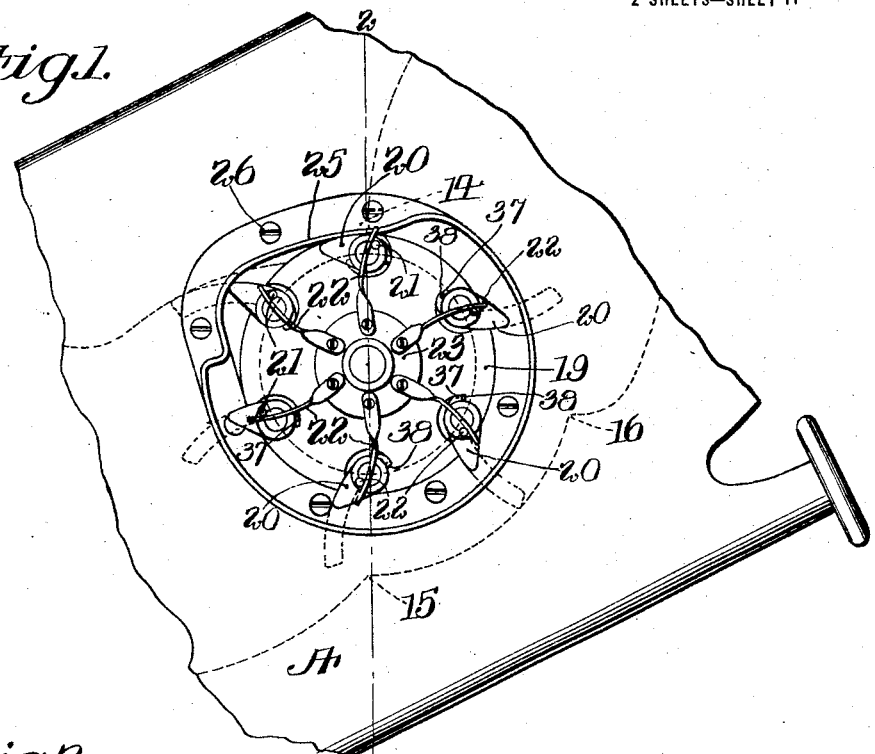
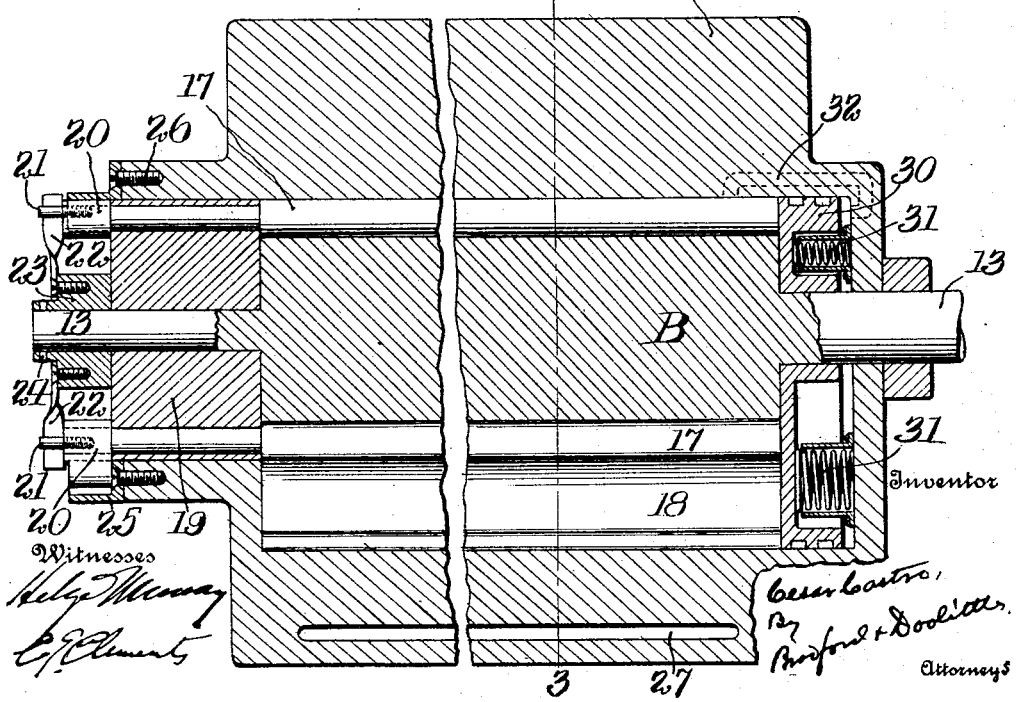

C. CASTRO.
FLUID MIXER AND POWER GENERATOR FOR ROTARY ENGINES.
APPLICATION FILED OCT. 20, 1914.
1,185,982.
Patented June 6, 1916.
2 SHEETS—SHEET 2.
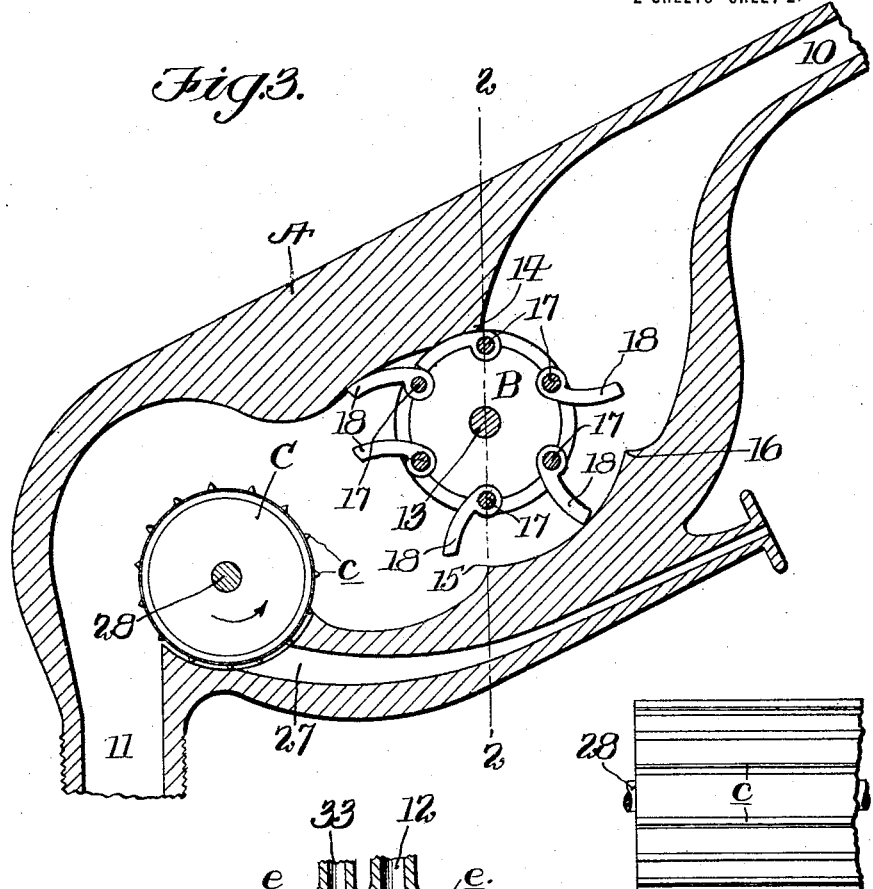
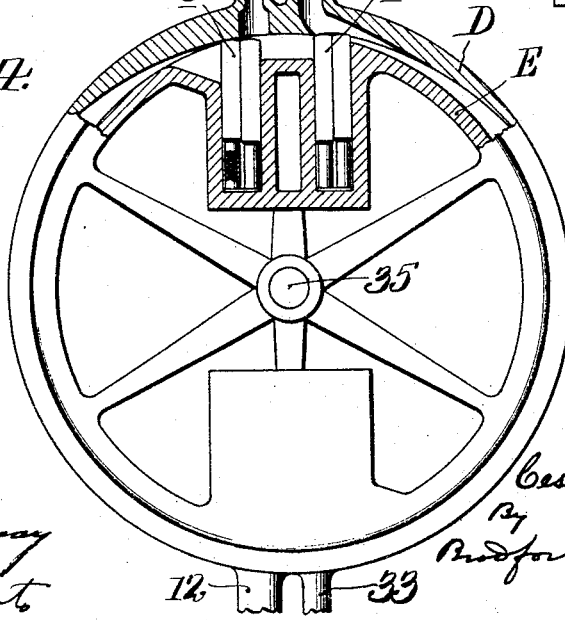
Witnesses
Inventor
Cesar Castro,
By
Bradford & Doolittle,
Attorneys

UNITED STATES PATENT OFFICE.

CESAR CASTRO, OF NEW YORK, N. Y.

FLUID-MIXER AND POWER-GENERATOR FOR ROTARY ENGINES.

1,185,982.     Specification of Letters Patent.    Patented June 6, 1916.

Application filed October 20, 1914. Serial No. 867,604.

*To all whom it may concern:*

Be it known that I, CESAR CASTRO, a citizen of the United States, residing at Bronx, New York, county and State of New York, have invented and discovered certain new and useful Improvements in Fuel-Mixers and Power-Generators for Rotary Engines, of which the following is a specification.

My said invention relates to a specific form of fuel mixing and power generating apparatus formed in connection with a combustion chamber and adapted for supplying power continuously to a rotary engine or motor, whereby the air and oil, or other fuel elements, may be mixed in proper proportion and under suitable conditions to secure the power and speed desired, all as will be hereinafter more fully described and claimed.

Referring to the accompanying drawings which are made a part hereof and on which similar reference characters indicate similar parts, Figure 1 is a side elevation of the casing containing a combustion chamber and the fuel mixing apparatus forming the particular subject matter of my said invention, Fig. 2 a cross section through the same on the dotted line 2—2 in Figs. 1 and 3, Fig. 3 a longitudinal section through the same on the dotted line 3—3 in Fig. 2, Fig. 4 a detail view illustrating the type of motor with which my fuel mixing and power generating apparatus is intended for use, and Fig. 5 a detail view showing a portion of the fuel feeding roller in elevation.

In said drawings the portions marked A represent the casing of the fuel mixing and power generating apparatus, B the air feeding roller, C the fuel feeding roller, D the casing of the motor or engine, and E the rotary piston or cylinder of said motor or engine.

The casing A is preferably a casting of the form substantially as indicated in the drawings and containing a chamber adapted to serve as a fuel mixing and combustion chamber. The air inlet 10 is connected with an air compressor, or a compressed air supply (not shown) and the outlet 11 is connected to the inlet 12 of the rotary engine or motor B.

The air feeding roller B is provided with journals 13 which are mounted in appropriate bearings in the sides of casing A. It is positioned in a throat formation within the chamber in the casing A as between the point 14 on one side and the points 15 and 16 on the other side. The upper surface of the roller is positioned in close proximity to the point 14, thus serving as a cut-off between the air inlet 10 and the outlet 11 of the chamber at the upper side of said roller. The lower side of said roller is positioned a distance from the point 15 and its companion point 16, which points are positioned at the ends of the arc of a circle having the same center as said roller, and of shorter radius than the portions of the chamber each side of said points. Said roller B is formed with a series of longitudinal grooves spaced about its periphery, semi-circular in cross section, in each of which is mounted a shaft 17 having an outwardly extending curved blade 18 mounted thereon, which blades are of a length corresponding to the width of the chamber. One journal 13 of the roller B is provided with a ring 19 of somewhat larger diameter than roller B, in which the ends of said shafts 17 are journaled. A lug 37 is positioned on one side of each of said shafts, at one end, adapted to contact with a shoulder 38 in ring 19 and limit the turning of the shaft in one direction. Said shafts 17 extend through said ring 19 and each has a cam 20 rigidly secured to its outer end. In each of said cams, to one side of its center, is mounted a pin 21 against which a spring 22 bears. Said springs 22 are secured rigidly on a collar 23 which is secured to the outer end of journal 13 by a pin 24. Said springs 22 thus tend to turn the shafts 17 to throw the wings or blades 18 outwardly with lugs 37 against shoulders 38. A cam ring 25, of a form best shown in Fig. 1, is secured by screws 26 to the end of the casing A surrounding the outer end of ring 19 and is formed as a track for the cams 20 and to control the position of the blades R. By reason of the radius of the arc of the circle between the points 15 and 16 being slightly greater than the distance between the axis of the roller and the point of the blades 20 when in their normal position with the lugs 37 in contact with the shoulders 38, each blade, in its normal position, will pass freely by said point 16. Immediately on meeting the pressure from the gases in the chamber, however, said blade will be forced back with its outer edge contacting with the surface of the arc between said points 15 and 16, and thus serving as a cut-off and preventing the pressure from escaping back of said roller. As soon as the edge of the blade passes the point 15 the pressure will become equalized on each side thereof, permitting the spring 22 to throw the same into its normal position. The blades are closed while passing under point 14 by the action of the cams 20 guided by the cam ring 25. On the other journal 13 of roller B is mounted a drum 30 formed with packing rings in its periphery and adapted to be held against the end of roller B, and the ends of shafts 17 by means of springs 31, and thus insure that the joints will remain tight and provide against leakage and lost motion in operation by reason of wear. A port 32 (see dotted lines in Fig. 2) may be formed in the casing A leading from the combustion chamber to the outside of drum 30 in order to equalize the pressure on the opposite sides thereof.

The roller C is mounted over the mouth of a fuel inlet port 27 formed in the casing A below the mixing chamber. Said roller is mounted on journals 28 in suitable bearings in the sides of casing A. It is formed with longitudinal ribs $c$ on its periphery spaced equi-distant apart, and extending from end to end, the points of which are in close proximity to the casing on each side of the outlet of port 27. The outer end of said port 27 is connected to an oil, or other fuel supply, (not shown).

The motor D is shown to illustrate a type of motor with which my improved fuel mixing and power generating apparatus is intended for use and consists of a cylinder D, containing, preferably, a series of rotors E, which may be located side by side and each have radially movable blades $e$ at stated intervals, as on opposite sides, in its periphery. The connection being made between the chamber A and the motor, by connecting a suitable pipe with the outlet 11 of said chamber and with the inlet 12 of said motor, the expansion of the gases behind pistons E cause the motor to revolve, the spent gases being exhausted through the exhaust ports 33, as will be readily understood.

Rollers B and C are driven by appropriate gearing (not shown) at the speed required to supply the requisite proportion of oil and air to make the character of mixture desired. The pressure under which the air and oil is supplied to the feeding apparatus can be regulated by any appropriate means so as to proportion the supply of the respective mixtures to secure the best results. The mixture is ignited within the chamber of the casing A and turns constantly therein. The expansion of the gases caused by the continuous combustion within the casting A serving to create a constant pressure, which is imparted to the rotors of the motor through the port 11, and the power thus generated may be transmitted from the shaft 35 of said motor in any manner desired, as will be readily understood.

Having thus fully described my said invention, what I claim as new and desire to secure by Letters Patent is:

1. The combination with a rotary motor of a fuel mixing and power generating apparatus comprising a casing formed with a combustion chamber, an air inlet and an oil inlet leading into said combustion chamber, an air supply regulating roller mounted in the throat of said air inlet, an oil supply regulating roller mounted in the throat of said oil inlet, means for rotating said respective rollers to feed the air and oil into the combustion chamber, and means connecting the combustion chamber to the motor for driving the same under constant pressure, substantially as set forth.

2. The combination with a rotary motor of a fuel mixing and power generating apparatus comprising a casing having a combustion chamber formed therein, an air inlet to said combustion chamber, a roller mounted in the throat of said air inlet, and formed with radially projecting collapsible blades, means for holding said blades rigidly extended during one part of each rotation of said cylinder, means for collapsing said blades during the other part of the rotation of said cylinder, said casing being also formed with a hydro-carbon fuel supply inlet, another roller mounted in the throat of said hydro-carbon supply inlet, said roller being formed with longitudinal ribs spaced about its periphery and adapted to feed the fuel into said combustion chamber in a thin layer, and means for connecting said combustion chamber to the motor, whereby said motor is driven under constant pressure from the power generated by the combustion of the mixture in said combustion chamber, substantially as set forth.

3. The combination with a rotary motor of a fuel mixing and power generating apparatus comprising a casing formed with a combustion chamber, an air inlet, and a fuel inlet leading into said combustion chamber, a roller mounted on one side of the throat of said air inlet with its periphery in close proximity to said side, a series of blades mounted on rock-shafts spaced about the periphery of said roller and adapted to project therefrom to close the space between the other side of said roller and the other side of the throat of said air inlet, means for extending said blades when passing through the said open side and for closing said blades when passing under the closed side, another roller mounted over the throat of the oil inlet, formed with longitudinal ribs on its periphery, means for driving said rollers to feed the air and oil, respectively, into said combustion chamber, and means for connecting said combustion chamber with said rotary motor, whereby said motor is driven under constant pressure from the power generated by the combustion of said mixture in said combustion chamber, substantially as set forth.

4. The combination with a rotary motor of a fuel mixing and power generating apparatus comprising a casing having a combustion chamber formed therein, an air inlet to said combustion chamber, a roller mounted in the throat of said inlet and formed with radially projecting collapsible blades, means for holding said blades in a normally extended position with their outer edges a distance from the axis of the roller slightly less than the distance from said axis to the casing on one side of said roller, said blades being mounted to turn freely in rearward direction whereby the pressure from the combustion chamber will turn said blades to a cut-off position while passing through the air inlet thereto, means for collapsing said blades during the other part of the rotation of said cylinder, said casing being also formed with a hydro-carbon fuel supply inlet, another roller mounted in the throat of said fuel supply inlet and formed with longitudinal ribs spaced about its periphery and adapted to feed the fuel into said combustion chamber, and means for connecting said combustion chamber to the motor, whereby said motor is driven under constant pressure by the combustion of the mixture in said combustion chamber, substantially as set forth.

In witness whereof, I have hereunto set my hand and seal at New York, N. Y., this nineteenth day of October, A. D. nineteen hundred and fourteen.

CESAR CASTRO. [L. S.]

Witnesses:
A. B. FALCAS,
V. GONZALES BAZO.

Copies of this patent may be obtained for five cents each, by addressing the "Commissioner of Patents, Washington, D. C."